United States Patent [19]

Yokoi

[11] 4,433,537

[45] Feb. 28, 1984

[54] METHOD OF MANUFACTURING A ROW OF CONTINUOUS COUPLING ELEMENTS FOR SLIDE FASTENERS

[75] Inventor: Fumiaki Yokoi, Uozu, Japan

[73] Assignee: Yoshida Kogyo K. K., Tokyo, Japan

[21] Appl. No.: 379,290

[22] Filed: May 18, 1982

[30] Foreign Application Priority Data

May 22, 1981 [JP] Japan .................................. 56-77560

[51] Int. Cl.³ .................... D01H 13/26; D01H 13/32; B29C 17/02; B29D 5/00
[52] U.S. Cl. ...................................... 57/264; 57/1 R; 425/814
[58] Field of Search ..................... 57/1 R, 6, 138, 264, 57/265, 311; 425/391, 814

[56] References Cited

U.S. PATENT DOCUMENTS

| | | | |
|---|---|---|---|
| 2,541,728 | 2/1951 | Wahl | 57/1 R |
| 2,817,206 | 12/1957 | Schwartz | 57/1 R |
| 2,907,066 | 10/1959 | Wahl | 57/1 R |
| 3,431,337 | 3/1969 | Heimberger | 425/814 X |
| 3,572,023 | 3/1971 | Galonska | 57/1 R |
| 3,613,347 | 10/1971 | Carruthers | 57/264 X |
| 3,680,604 | 8/1972 | Frohlich et al. | 57/138 X |
| 3,917,787 | 11/1975 | Hansen | 425/814 X |
| 3,945,181 | 3/1976 | Yamazaki et al. | 57/264 |
| 3,984,970 | 10/1976 | Terada et al. | 57/1 R |
| 4,090,832 | 5/1978 | Moertel | 57/6 X |

Primary Examiner—Donald Watkins
Attorney, Agent, or Firm—Hill, Van Santen, Steadman & Simpson

[57] ABSTRACT

Thermoplastic filamentary material is continuously formed into a row of helically coiled or zigzag coupling elements for slide fasteners. One of the coupling elements as thus formed is measured for a dimension thereof. The measured dimension is compared with a reference value to detect a dimensional error, if any, of the measured one of the continuous coupling elements. The tensioning of the thermoplastic filamentary material prior to being formed into the row of coupling elements is adjustably controlled on the basis of the dimensional error so as to remove the latter from subsequently formed coupling elements. The measurement of the coupling element may be effected while the row of coupling elements as formed is being held at rest.

2 Claims, 5 Drawing Figures

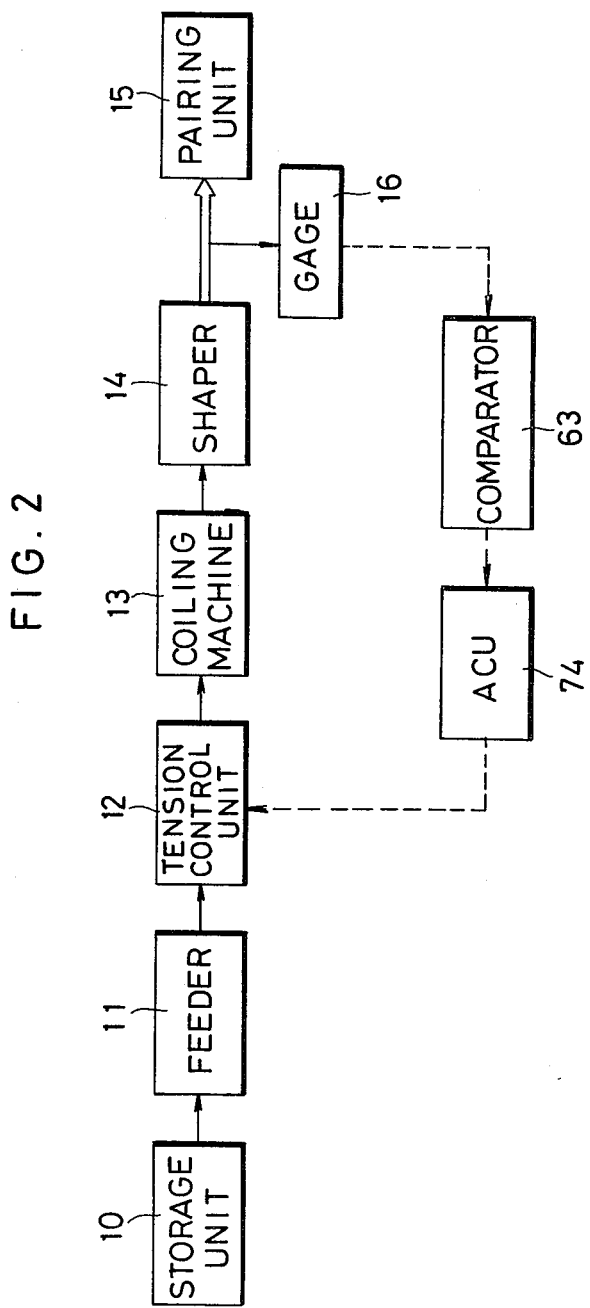

METHOD OF MANUFACTURING A ROW OF CONTINUOUS COUPLING ELEMENTS FOR SLIDE FASTENERS

BACKGROUND OF THE INVENTION

1. Field of the Invention

The present invention relates to a method of continuously manufacturing a row of helically coiled or zigzag coupling elements for a slide fastener which are made of thermoplastic filamentary material.

2. Prior Art

There has heretofore been practiced a method of manufacturing a row of helically coiled slide fastener coupling elements as disclosed in U.S. Pat. No. 3,984,970 (Terada et al), patented Oct. 12, 1976. According to the disclosed method, a thermoplastic filament is slackened before it continuously enters a coiling device, an adjustable weight is suspended from the slackened portion of the filament, and the adjustable weight is adjusted to maintain the filament under desired tensioning forces.

It is known that as the filament, while it is being coiled around a mandrel, is kept under greater tension, the helically coiled coupling elements thus fabricated have smaller dimensions, that is, the length and width of coupling element legs, and conversely, as the filament undergoes smaller tension, the formed coupling elements have larger dimensions. Therefore, the dimensions of coupling elements can be changed as desired by adjusting the weight by which the element-forming filament is tensioned. The above principle holds true for the manufacture of meandering or zigzag coupling elements.

With the conventional method, the dimensions of the coupling elements that are manufactured are measured by the operator with a gage at suitable intervals of time, and the filament tension is varied by selectively adding or removing weights on the basis of the measurements. The gaging and weight adjusting processes have heretofore been tedious and time-consuming. It has also been unable to make coupling elements of uniform dimensions and shapes for the following reasons: The filament is made of synthetic resin such, for example, as nylon or polyester, and hence its properties, such as elongation, tend to change due to variations in environmental conditions such as temperature and humidity. Before being formed into continuous coupling elements, the filament is stored on a large-size bobbin. The filament properties are liable to vary at radially inward and outward positions or upper and lower positions on the filament wound around the bobbin, dependent on the amount of filament and the conditions under which the bobbin is mounted. Therefore, the filament as it is unwound from the bobbin varies in property from position to position on the filament. The filament is subject to continuous property variations while it is being continuously supplied to a coiling machine. The prior method has been unable to adjust the filament tension in a manner to cancel out such continuous property changes of the filament prior to the coiling thereof, with the result that the coupling elements as formed suffer from varying dimensions and shapes, which will prevent smooth intermeshing engagement of a pair of companion rows of coupling elements that are manufactured.

SUMMARY OF THE INVENTION

It is an object of the present invention to provide a method of manufacturing a row of continuous coupling elements, helically coiled or zigzag-shaped, which are of uniform dimension and shape, and of high precision and product quality.

Another object of the present invention is to provide a method of manufacturing a row of continuous coupling elements of filamentary material while adjustably tensioning the latter to neutralize or cancel out changes in the properties thereof due to variations in ambient temperature, humidity and other environmental conditions.

According to the present invention, one element of a row of continuous coupling elements as formed from thermoplastic filamentary material is measured for a dimension thereof. The measured dimension is compared with a reference value to detect a dimensional error, if any, of the measured one of the continuous coupling elements. The tensioning of the thermoplastic filamentary material prior to being formed is adjustably controlled on the basis of the dimensional error so as to remove the dimensional error from the subsequently formed coupling elements. The coupling element dimension may be measured while the formed coupling elements are held at rest.

Many other advantages, features and additional objects of the present invention will become manifest to those versed in the art upon making reference to the detailed description and the accompanying sheets of the drawings in which preferred embodiments incorporating the principles of the present invention are shown by way of illustrative example.

BRIEF DESCRIPTION OF THE DRAWINGS

FIG. 2 is a block diagram of the apparatus shown in FIG. 1, with a control circuit for controlling a tension control unit being included;

DETAILED DESCRIPTION

Figure 1:
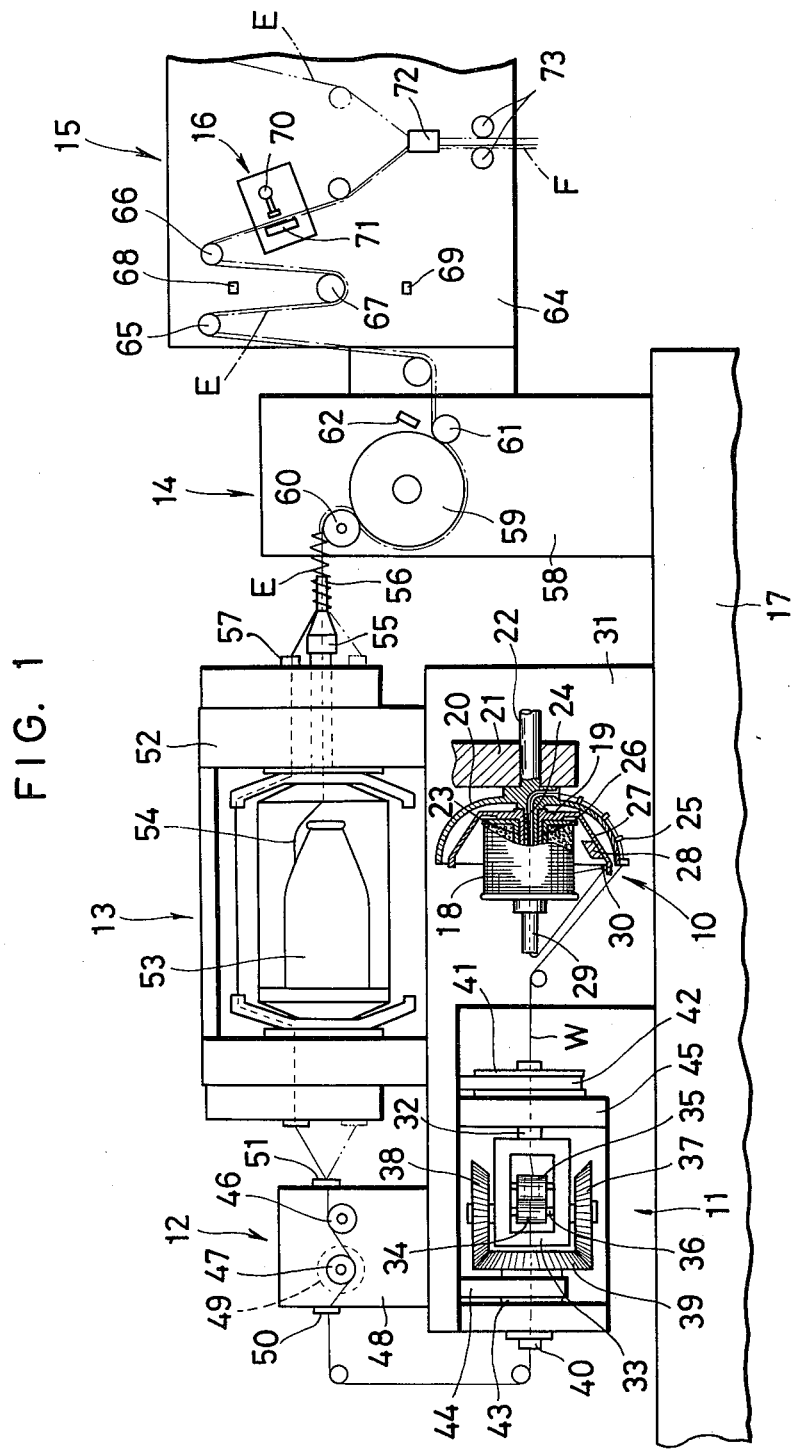
FIG. 1 is a side elevational view of an apparatus for manufacturing a row of helically coiled slide fastener coupling elements, the apparatus being employed to carry out a method according to the present invention.

As shown in FIG. 1, an apparatus for continuously manufacturing a row of helically coiled coupling elements comprises in general a filament storage unit 10, a filament feeder 11, a tension control unit 12, a coiling machine 13, a coupling element shaper 14, a coupling element pairing unit 15, and a gage 16, all carried on a base 17.

The filament storage unit 10 includes a storage bobbin 18 on which thermoplastic filamentary material W is wound, a filament guide 19 disposed around the storage bobbin 18, and a rotor 20 coaxially rotatable around the storage bobbin 18. The rotor 20 is coupled to a drive shaft 22 rotatably journalled in a frame member 21 of a frame 31 mounted on the base 17. The rotor 20 is in the form of a cup, and has a horizontal shaft 23 extending coaxially with the drive shaft 22. The shaft 23 has a filament passage 24 extending coaxially and having one end opening behind the rotor 20. The rotor 20 has on its convex back a plurality of filament guide members 25.

The filament guide 19 comprises a central sleeve 26 on which the storage bobbin 18 is mounted, and a guide arm 27 extending from the central sleeve 26 into underlying relation to the storage bobbin 18. The central sleeve 26 is rotatably mounted on the shaft 23 of the rotor 20. The guide arm 27 has a weight 28 which serves to keep the guide arm 27 positioned stationarily due to gravity.

The storage bobbin 18, which is rotatable on the central sleeve 26, has a filament guide sleeve 29 having a guide hole (not shown) in its distal end portion which communicates with the filament passage 24 through the shaft 23. The filament W as it is unwound from the storage bobbin 18 passes through a guide hole 30 in the guide arm 27, goes to the distal end of the filament guide sleeve 29, passes through the guide hole in the filament guide sleeve 29 and the filament passage 24 in the shaft 23, emerges behind the rotor 20, and goes via the filament guide members 25 toward the filament feeder 11.

The filament feeder 11 serves to withdraw the filament W positively from the filament storage unit 10 and to twist or rotate the filament W about its own axis. The filament feeder 11 comprises a fixed frame 45 dependent from an extension of the frame 31, and a rotatable frame 33 supported by a drive shaft 32 on the fixed frame 45, there being a pair of drive and pinch rollers 34, 35 rotatably mounted on the rotatable frame 33 and disposed closely in parallel relation to each other. The drive roller 34 has a shaft 36 rotatably journalled on the rotatable frame 33 and supporting thereon a pair of bevel gears 37, 38 that is held in mesh with a bevel gear 39 which is supported by a shaft 40 on the fixed frame 45. One of the pair of bevel gears (37, for example) is connected directly to the shaft 36 for driving the drive roller 34. The rotatable frame 33 is rotatable by a motor (not shown) through a belt 42 trained around a pulley 41 fixed to the drive shaft 32. The bevel gear 39 is also rotatable by the motor via a belt 44 trained around a pulley 43 fixed to the shaft 40. The drive roller 34 is thus rotatable by the bevel gear 39 through the bevel gear 37. The drive shaft 32 and the shaft 40 have coaxial holes (not shown) for passage therethrough of the filament W as supplied from the filament storage unit 10. The filament W which is withdrawn from the filament storage unit 10 enters into the hole in the drive shaft 32, passes along one side of the pinch roller 35, is sandwiched between the drive and pinch rollers 34, 35, then makes a single convolution around the drive roller 34, and passes through the hole in the shaft 40 toward the tension control unit 12. Since the pulleys 41, 43 have different diameters, the rotatable frame 33 is rotatable with respect to the bevel gear 39, and hence the drive roller 34 is rotatable about its shaft 36 to positively feed the filament W wound therearound.

The tension control unit 12 includes a frame 48 mounted on the extension of the frame 31 in overlying relation to the filament feeder 11. The tension control unit 12 includes a pair of front and rear rollers 46, 47 rotatably mounted on the frame 48, the rear roller 47 having a shaft which is coupled to a brake 49. The brake 49 is preferably a hysteresis brake for producing a torque in proportion to a given control current or voltage applied. Alternatively, the brake 49 may comprise an electromagnetic brake. The front roller 46 is idly rotatable on the frame 48. The filament W as supplied from the filament feeder 11 passes through a guide 50, is wound in two or three turns around the rear roller 47, then is wound in one or two turns around the front roller 46, and goes out through a guide 51 toward the coiling machine 13.

The coiling machine 13 is of a known construction including a frame 52 mounted on the frame 31 and supporting therein a bobbin 53 carrying thereon a core thread 54. A mandrel holder 55 is supported on the frame 52 and supports a coaxial mandrel 56. The mandrel holder 55 and the mandrel 56 have aligned holes for passage therethrough of the core thread 54. The coiling machine 13 also includes a coiling rotor 57 rotatably mounted on the frame 52 for coiling the filament W around the mandrel 56 into a row of successively formed helical coupling elements E. The helically coiled coupling elements E thus formed are then introduced into the element shaper 14.

The element shaper 14 comprises a frame 58 mounted on the base 17, a heated die wheel 59 rotatably mounted on the frame 58 for shaping and setting the helically coiled coupling elements E thereon, a pair of pinch rollers 60, 61 rotatably supported on the frame 58 for pressing the coupling elements E against the die wheel 59, and a nozzle 62 mounted on the frame 58 for blowing cooling air against the coupling elements E as the latter leave the die wheel 59. The helically coiled coupling elements E which have been shaped and set by the element shaper 14 are then introduced into the element pairing unit 15.

The element pairing unit 15 is shown in FIG. 1 in its substantially half portion, and has a frame 64, a pair of guide rolls 65, 66 rotatably mounted on the frame 64, a tension roll 67 carried on the row of helically coiled coupling elements E extending in suspended relation between the guide rolls 65, 66, a pair of upper and lower limit switches 68, 69 attached to the frame 64 for sensing upper and lower positions, respectively, of the tension roller 67 as it moves vertically, a pairing guide 72 mounted on the frame 64, and a pair of withdrawal rolls 73 rotatably mounted on the frame 64 downwardly of the pairing guide 72. The row of helically coiled coupling elements E and another row of helically coiled coupling elements E which have been formed by another apparatus identical to that which is shown in FIG. 1, are mated together by the pairing guide 72 into a slide fastener chain F, which is discharged by the pair of withdrawal rolls 73.

The gage 16 is fixedly mounted on the frame 64 of the element pairing unit 15. The gage 16 serves to measure a dimension of one of the coupling elements at a time which have been shaped and set by the element shaper 14 and to produce an electrical signal dependent on the measured dimension. The gage 16 comprises a guide member 71 having a channel (not shown) for guiding the row of helically coiled coupling elements E therein, and a dial gage 70 disposed in confronting relation to the guide member 71. When the row of helically coiled coupling elements E is intermittently held at rest in its longitudinal travel, a probe of the dial gage 70 is moved into contact with one of the coupling elements E to measure a dimension thereof for generating an electrical signal dependent thereon. The dial gage 70 may be replaced with a micrometer, a limit gage, a thickness gage, a photoelectric measurement device, or other known measurement means.

Operation of the apparatus thus constructed is as follows: The thermoplastic filamentary material W is continuously supplied from the filament storage unit 10 into the coiling machine 13 while the filamentary material W is being coiled into a row of coupling elements E. The filamentary material W is fed by the filament feeder 11 as the rotatable frame 33 rotates in a direction to give the filament W a countertwist which will later be removed when the filament W is coiled around the mandrel 56 in the coiling machine 13. When the rotatable frame 33 rotates with respect to the bevel gear 39, the drive roller 34 is caused to rotate about its shaft 36 to feed the filament W along toward the coiling machine 13 via the tension control unit 12. The row of helically coiled coupling elements E as they are formed by the coiling machine 13 is shaped and set by the element shaper 14, and then enters the element pairing unit 15. The row of coupling elements E is tensioned by the tension roll 67 between the guide rolls 65, 66. The rate of travel of the row of coupling elements E is adjustably controlled by vertical movement of the tension roll 67. More specifically, when the rate of travel of the row of coupling elements E is higher than that of the other row of coupling elements E while the withdrawal rolls 73 are at rest, the tension roll 67 moves downwardly until it first contacts the lower limit switch 69, whereupon the latter supplies an electrical signal to actuate the withdrawal rolls 73. Conversely, when the rate of travel of the row of coupling elements E is lower than that of the other row of coupling elements E while the withdrawal rolls 73 are being driven, the tension roll 67 ascends into contact with the upper limit switch 68, which then produces an electrical signal to stop the withdrawal rolls 73. The tension roll for the other row of coupling elements E operates in the same manner. Thus, the withdrawal rolls 73 are intermittently driven to take up any difference between the rates of travel of the two rows of coupling elements E, E that are to be paired together.

When the withdrawal rolls 73 are held at rest, that is, when the row of coupling elements E is stopped between the guide roll 66 and the pairing guide 72, the probe of the dial gage 70 is brought into contact with one of the coupling elements E to measure a dimension thereof. Where the gage 16 is in the form of a photoelectric measurement device having no contacting part, the coupling elements E can be continuously measured for their dimensions while they are being longitudinally fed.

The dimension as measured by the gage 16 is converted into a corresponding electrical signal, which is then supplied to a comparator 63 (FIG. 2) in which the electrical signal is compared with a reference value indicative of a desired coupling element dimension. When the electrical signal and the reference value are not in agreement, the comparator 63 generates an electrical signal indicative of a dimensional error, which is supplied to an arithmetic control unit 74. The arithmetic control unit 74 is responsive to the supplied dimensional error signal for supplying the tension control unit 12 with a signal for controlling the brake 49 to adjustably control the tensioning of the filamentary material W.

Figure 3:
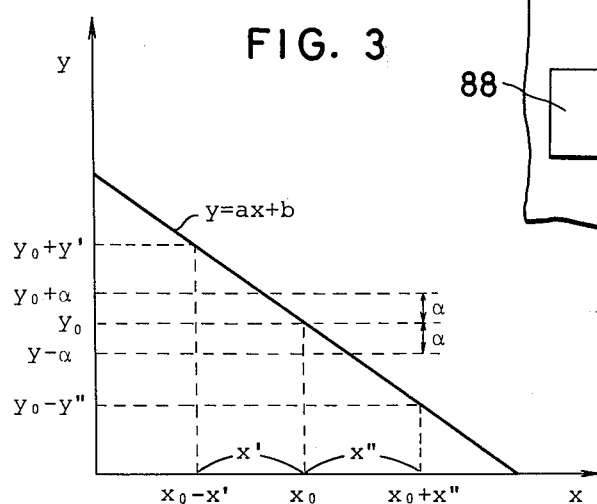
FIG. 3 is a graph illustrative of the relation between the dimension of the coupling elements and the tension of a filamentary material from which the coupling elements are formed.

The tension x of the filamentary material W as it is introduced into the coiling machine 13 and the dimension y of a formed coupling element have a relationship which can be expressed by the linear function: $y = ax + b$ ($a < 0$), as shown in FIG. 3. It is now assumed that a desired element dimension is given as $y_0$, a tension for attaining the dimension $y_0$ is given as $x_0$, and the tolerances for the dimension $y_0$ are given as $\pm a$. When formed coupling elements have a dimension of $y_0 + y'$ which is larger than $y_0 + a$ (where the filament material undergoes a tension of $x_0 - x'$), the filament tension should be increased by $x'$ to reach $x_0$ for attaining the desired element dimension $y_0$. Conversely, when coupling elements having a dimension of $y_0 - y''$ which is smaller than $y_0 - a$ are formed (where the filament material W is subjected to a tension of $x_0 + x''$), the tension of the filament material W should be decreased by $x''$. The tensioning forces can be varied by changing the braking forces imposed by the brake 49 on the filamentary material W in the tension control unit 12 in response to a control current or voltage supplied to the brake 49. Such a control current or voltage is produced by the arithmetic control unit 74 on the basis of a dimensional error determined by the comparator 63, as described above.

The comparator 63 and the arithmetic control unit 74 may be in the form of a microcomputer which is programmed to effect the tension adjusting operation.

Figure 4:
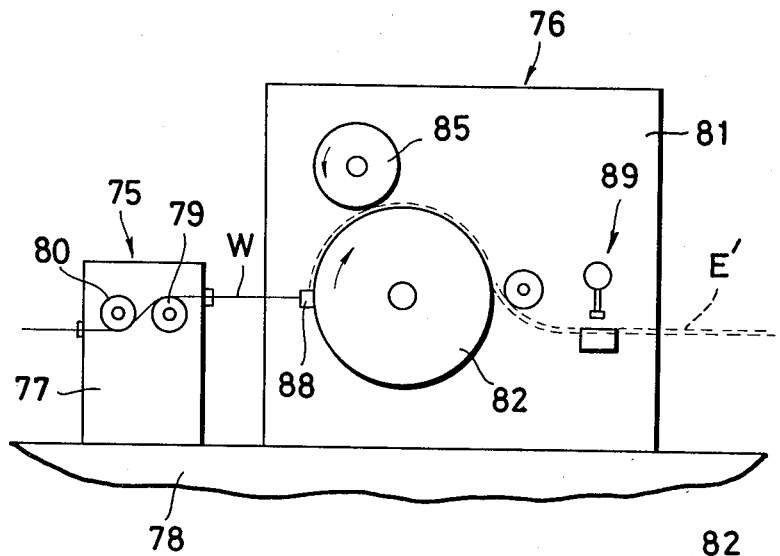
FIG. 4 is a side elevational view of an apparatus for manufacturing a row of meandering or zigzag coupling elements.
Figure 5:
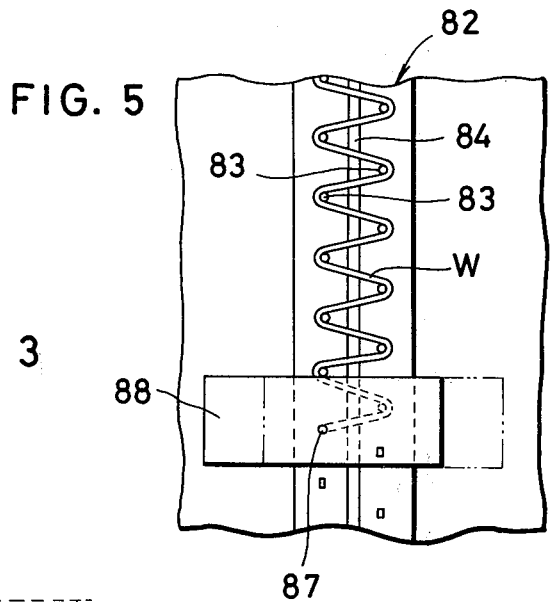
FIG. 5 is a fragmentary front elevational view of a die wheel and a filament guide in the apparatus of FIG. 4 for shaping zigzag coupling elements.

FIGS. 4 and 5 illustrate an apparatus for manufacturing a row of continuous zigzag coupling elements for slide fasteners. The apparatus includes a tension control unit 75 and an element forming unit 76, both mounted on a base 78. The tension control unit 75 comprises a frame 77 supported on the base 78, and a pair of guide rollers 79, 80 rotatably mounted on the frame 77, one of the guide rollers being adjustably braked. The element forming unit 76 comprises a frame 81 supported on the base 78, a die wheel 82 rotatably mounted on the frame 81 and having two rows of circumferentially staggered pins 83, 83 disposed one on each side of a central groove 84 in the die wheel 82, and a bending roller 85 rotatably supported on the frame 81 and having a peripheral edge fitted in the central groove 84. A guide member 88 is movable back and forth in the axial direction of the die wheel 82 across the central groove 84 and has a guide hole 87 for passage therethrough of a filament W of thermoplastic material. In operation, the filament W is supplied via the tension control unit 75 into the element forming unit 76, in which the filament W passes through the guide hole 87. By moving the guide member 88 back and forth in a direction parallel to the axis of the die wheel 82 while the latter is being rotated clockwise as shown in FIG. 4, the filament W is caused to extend alternately around the pins 83 across the central groove 84 as shown in FIG. 5. The filament W as thus bent into a zigzag form is pushed by the bending roller 85 into the central groove 84 to form a row of zigzag coupling elements E' having parallel legs. The zigzag coupling elements E' which have left the die wheel 82 are measured for dimensions thereof by a gage 89 mounted on the frame 81 for controlling the tension control unit 75 to adjustably control the tension to which the filament W is subjected prior to introduction into the element forming unit 76.

With the arrangement of the present invention, helically coiled or zigzag coupling elements can be dimensioned as desired even when filamentary material from which the coupling elements are formed varies in properties due to temperature, humidity, storage conditions, and other factors. Thus, slide fastener coupling elements of uniform dimension, better accuracy, and stable quality can be manufactured. Furthermore, the rate of production of coupling elements is increased since there are no manual measurement and weight replacement needed.

Although various minor modifications might be suggested by those versed in the art, it should be understood taht I wish to embody within the scope of the patent warranted hereon all such embodiments as reasonably and properly come within the scope of my contribution to the art.

I claim as my invention:

1. A method of manufacturing a row of continuous coupling elements of thermoplastic filamentary material, comprising the steps of:

(a) forming the thermoplastic filamentary material into the row of continuous coupling elements;

(b) measuring a dimension of one of the continuous coupling elements as formed;

(c) comparing the measured dimension with a reference value to detect a dimensional error, if any, of the measured one of the continuous coupling elements; and (d) adjustably controlling the tensioning of the thermoplastic filamentary material prior to the latter's being formed into the row of continuous coupling elements on the basis of said dimensional error so as to remove the dimensional error from subsequently formed coupling elements.

2. A method according to claim 1, wherein said dimension of said one of the continuous coupling elements is measured while the latter are being held at rest.

* * * * *